United States Patent [19]
Corlet

[11] 3,884,256
[45] May 20, 1975

[54] PORTABLE APPARATUS USING GAS UNDER PRESSURE

[75] Inventor: Gabriel Corlet, Genis Laval, France

[73] Assignee: Application des Gaz, Paris, France

[22] Filed: Nov. 16, 1973

[21] Appl. No.: 416,436

[30] Foreign Application Priority Data
Nov. 24, 1972 France ................. 72.42501

[52] U.S. Cl. ............... 137/322; 251/149.1; 126/38; 431/344
[51] Int. Cl. ................................................ F23q 3/00
[58] Field of Search ..... 251/142, 143, 149.1, 149.6, 251/149.7, 339; 285/317; 137/322; 431/344; 126/9 R, 38, 39 R; 222/5, 394, 402.1, 402.13, 402.14, 402.24, 402.25; 220/3, 46 P, 67, 8 SP, 80 SV

[56] References Cited
UNITED STATES PATENTS

| | | | |
|---|---|---|---|
| 925,959 | 6/1909 | Smith | 285/317 X |
| 2,853,126 | 9/1958 | Corlet | 222/5 |
| 3,189,016 | 6/1965 | Corlet | 222/5 X |
| 3,272,403 | 9/1966 | Alexander | 222/402.1 |
| 3,292,668 | 12/1966 | Little | 126/38 X |
| 3,400,704 | 9/1968 | Schlamp et al. | 126/38 |
| 3,608,538 | 9/1971 | Guerrero | 126/38 X |
| 3,620,660 | 11/1971 | Laurent | 431/344 X |

FOREIGN PATENTS OR APPLICATIONS
1,258,284  3/1961  France ................ 126/38

Primary Examiner—William R. Cline
Attorney, Agent, or Firm—Dowell & Dowell

[57] ABSTRACT

Portable apparatus, particularly for cooking, lighting or heating, using gas under pressure in a detachable cylindrical cartridge which is equipped with a valve including a check-valve member displaceable inwardly of the cartridge to allow gas to flow from its outlet, and comprising a gas inlet head for tight connection with this cartridge wherein the head includes an annular sealing packing of elastomeric material coaxially surrounding a finger capable of displacing the check valve member of the cartridge and of holding it open when the said cartridge is locked coaxially against the said head, the invention being characterized by a cartridge-receiving recess in the casing of the apparatus sized to snugly receive a gas cartridge, the inner end of the recess carrying said inlet head and having flared guide means for guiding the cartridge to engage its outlet with the head, and cartridge latching means for automatically latching a cartridge in the recess and holding it tightly engaged with the head and including release means for unlatching the cartridge so that it can be ejected by a spring located in the recess, the recess being shaped and sized such that when a cartridge is latched in place it fills the recess substantially flush with the casing and virtually closes the opening through which it was inserted.

7 Claims, 3 Drawing Figures

PORTABLE APPARATUS USING GAS UNDER PRESSURE

DESCRIPTION OF THE INVENTION

The invention relates to portable apparatus which uses gas under pressure in a detachable refill cartridge, which is itself equipped with an outlet valve having a check valve member.

This apparatus comprises a gas supply head, on which an annular joint of elastomeric material surrounds a coaxial finger capable of displacing inwardly and holding open the valve member of the cartridge valve when the latter, after having been introduced into the apparatus and secured in tight connection, is held locked against the said head.

In its most economical form, the refill cartridge designed as an expendable unit comprises a cylindrical wall of sheet metal, which is closed at its two ends by end plates which are fitted and crimped on the cylindrical wall by a beaded rim, one of the end plates having the said valve in its centre.

One particularly interesting application of the invention is concerned with the auxiliary apparatus for emergency purposes, travelling and camping purposes designed for cooking, lighting and heating, containing in a changeable refill cartridge a combustible gas in liquid phase, such as butane, propane or similar gases.

The invention has for its ogject to simplify the insertion and positioning of the cartridge in the apparatus, the extraction thereof from the latter and the replacement thereof by another.

Furthermore, it aims at avoiding the need for any intermediate cartridge securing element necessary for holding the cartridge in the apparatus and which would not be permanently attached to one or the other and as a result could be lost.

It is also concerned with automatic operation achievable by simply introducing the cartridge into the apparatus, with its tight connection and with its positive locking in fitted position, the cartridge is immune is to the thrust which the gas may exert on the gas inlet head against the cartridge.

It also has for its purpose to ensure, by a single action, the automatic ejection, at least partially, of the cartridge, with a view to replacing it by another.

To this end, the invention provides on the apparatus, in combination: firstly, means capable of ensuring the controlled guiding and the coaxial automatic centering of the cartridge in front of the gas inlet head and, secondly, non-return latching means capable of being yieldably retracted by the cartridge, during its insertion movement, but which becomes the cartridge automatically engaged in a positive locking position behind a part integral with the cartridge.

In addition, there is advantageously also provided on the apparatus a manual control for the release of the said latching means and a cartridge-ejecting spring.

Other important objects, advantages and features of the invention will become apparent from the description which is herinafter given to illustrate one practical embodiment, and by reference to the drawings.

Figure 1:
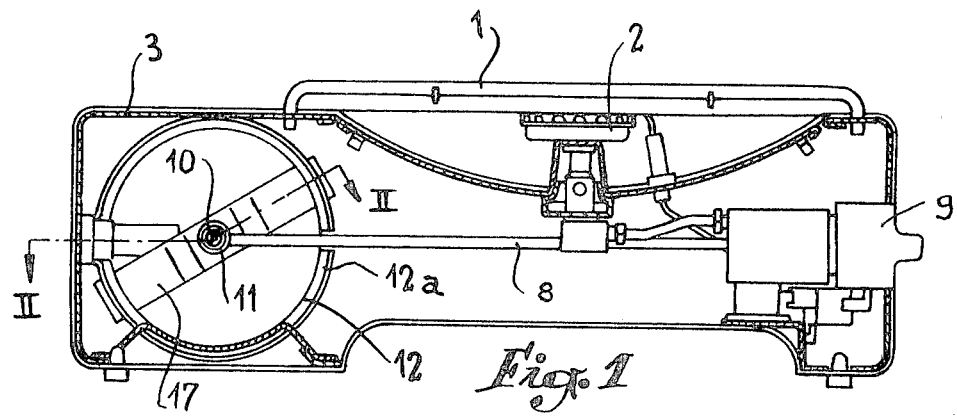
FIG. 1 is a diagrammatic section showing a portable gas stove with a removable refill cartridge, the assembly being made in accordance with the invention.

When designing a portable stove using liquefied butane gas, particularly for camping purposes, it is advantageous to equip the stove with a gas cartridge in the form of an elongated cylinder mounted horzitontally in the stove housing, so as to limit its height dimension to a maximum extent.

The portable stove comprises a grill 1 for supporting the casseroles or other containers above a burner 2, both are fixed on a housing 3 of sheet metal, forming a closed casing around a gas-supply member and a member for regulating the burner. A circular insertion aperture 3a (FIG. 2) is formed in a lateral face of this casing, the diameter of said aperture corresponding to the diameter of a cylindrical cartridge containing liquefied butane gas under pressure, indicated as a whole by 4.

This cartridge is advantageously made in the form of an expendable unit, from sheet metal in the manner of a can for preserves, and comprising a cylindrical peripheral wall 4a which is closed at its two opposite ends by concave end paltes 4b and 4'c, which are fixed by crimping to form a beaded rim 5 to the said wall 4a. Mounted in a central hole of the end plate 4b of the cartridge is a simplified valve, which is formed by a dished element of elastomeric material 6, of which the bottom serves as valve member and of which the peripheral wall, above openings 6a for the flow of gas, serves as a sealing joint for a second element 7 of sheet metal, likewise formed in the shape of a dish, which serves not only for its retention but also for the retection the elastomeric element, which it encloses by crimping around the rim of the said hole. Secondly the element 7 forms a seat for the said valve member, using its base around a gas outlet orifice 7a.

Facing the opening 3a, and on the internal surface of the opposite wall of the casing 3, is a fixed gas inlet head attached to a tube 8 connected to the burner 2, and in which is incorporated a flow regulating member 9. This head comprises a finger 10 which projects coaxially toward the opening 3a and which is centered in an annular packing 11 of elastomeric material communicating with the tube 8.

Provided on the same internal surface of the casing 3 is a cup of pressed sheet metal, forming at its periphery a guide sleeve 12, the diameter of which corresponds to the beaded rim 5. The guide sleeve coaxially surrounds the annular packing 11 and the finger 10, so as to serve for centering the cartridge 4.

For facilitating the introduction of the said cartridge, a flared funnel directed towards the opening 3a is formed with the free rim of the sleeve 12. It is understood that when the cartridge 4 is introduced into the stove through the opening 3a under these conditions, causing its end plate 4b to enter the sleeve 12, the cartridge is axially guided and its end plate is held in a central position facing the finger 10 when the cartridge is fully positioned in the sleeve 12, the annular packing 11 provides the tightness of the connection and the finger 10 displaces the valve member 6 from its seat 7, allowing the gas under pressure which is contained in the cartridge 4 to escape through the peripheral openings 6a which are provided in the cup-shaped member 6 and through the central hole 7a provided in the cup-shaped member 7, so as to pass through the annular packing 11 of the gas inlet head.

In order to hold the cartridge in this position, in which the rim of the entry opening 3a forms a supporting and holding annulus around the end plate 4b of the cartridge, it is necessary also to provide an axial holding means.

According to the invention, this axial holding means is provided by a resilient latching mechanism which automatically operates a positive locking means.

This latching mechanism could have been positioned behind the end plate 4c of the cartridge opposite to that carrying the valve. In this case, because of possible variations in length from one cartridge to another, the final position of connection to the packing 11 and the depth of penetration of the finger 10 into the central hole 7a would have not been well-established.

Figure 2:
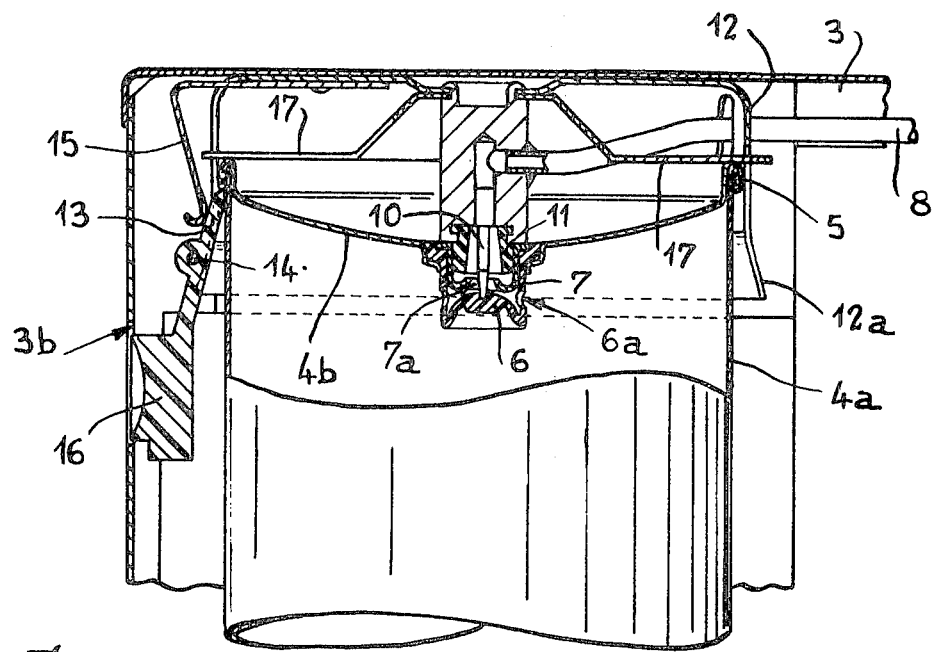
FIG. 2 shows partially in elevation and partially as a section along the line II—II of FIG. 1, but to a larger scale, the removable refill cartridge connected to the apparatus.
Figure 2:
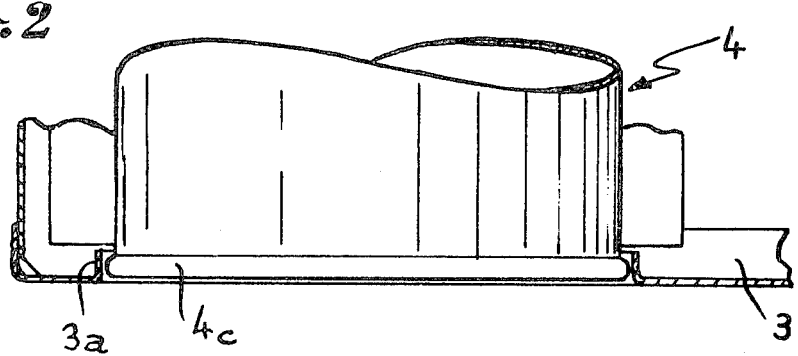

It is however possible to avoid this imprecision by resorting to a modificiation by which the latching means is located to act on the beaded rim 5 of the end plate 4b of the cartridge in which the valve 6–7 is mounted These axial retaining means can be selected in a particularly simple and practical manner as a pawl 13 pivoted to the periphery of the sleeve 12 on a pivot 14, and by using a spring 15 to push the pawl towards the interior of the sleeve 12 for latching it behind the beaded ring 5 of the end plate 4b of the cartridge as soon as this rim has passed beyond the end of the said pawl (FIG. 2).

The pawl 13 is advantageously fitted with a manual push button 16 which is accessible through a hole 3b in the casing 3, so that it is easily possible, by pressing on the button 16, to disengage the said pawl from the beaded rim 5 and hence to free the cartridge 4.

Figure 3:
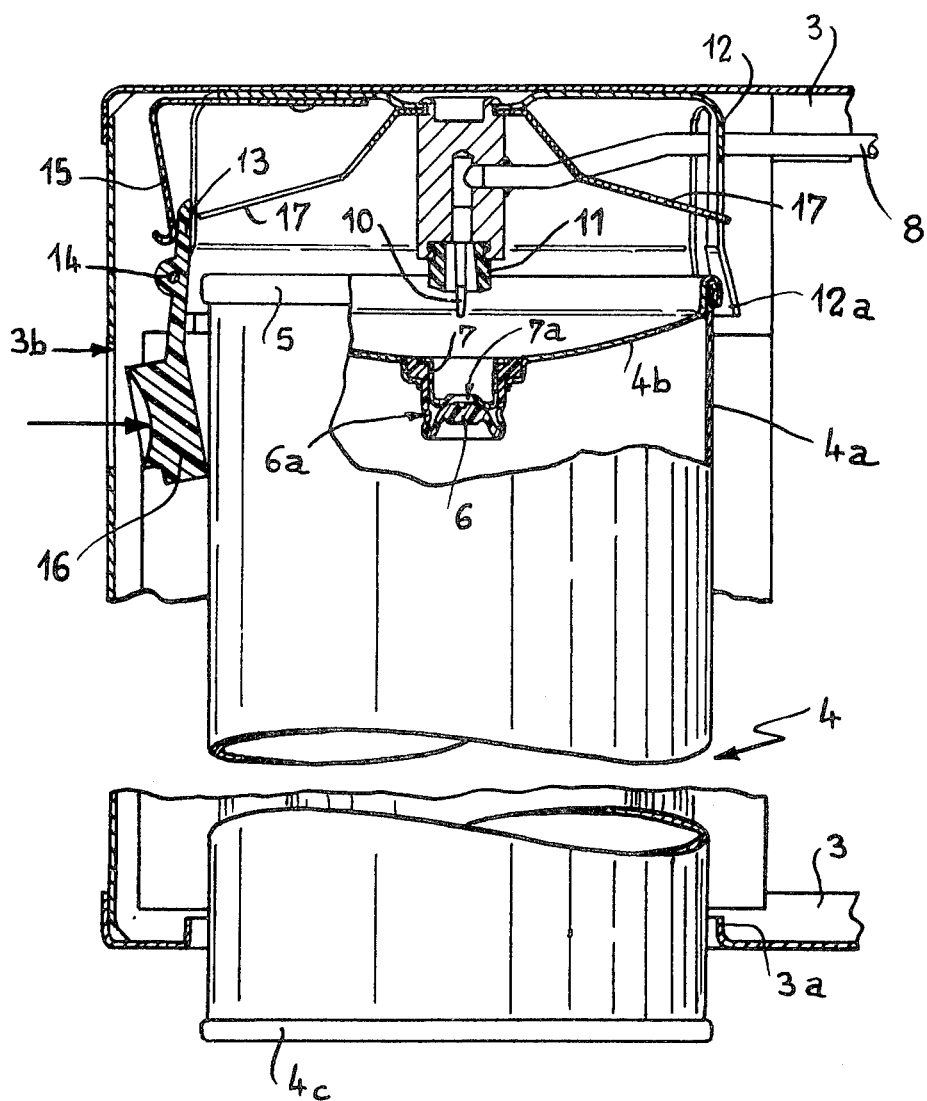
FIG. 3 shows in a view similar to FIG. 2 an empty cartridge at the moment of its ejection from the apparatus, with a view to being replaced by a full cartridge.

It is also expedient to provide an ejection spring in the sleeve 12a, which spring is in particular in the form of a simple diametral blade 17, capable of ensuring the rapid ejection of the cartridge 4 from the connection 11 when pressure is applied to the button 16, and of causing the cartridge 4 to be moved rearwardly in the casing 3 so that its valve member is closed and so that its opposite end projects sufficiently from the opening 3a to be easily gripped, as shown in FIG. 3. It is understood that it is possible in this way very quickly to replace a cartridge 4 by a full refill cartridge without having to remove a vessel which is on the grill 1.

It is also to be noted that the apparatus according to the invention provides great safety for the user, because if he should inadvertently press on the button 16, so that the locking of the connection is thereby released, any intermediate escape of gas is prevented at the level of the connection 11, firstly by the quick ejection of the cartridge 4 produced by the spring 17, and secondly by the closure of the valve member 6, the flame at the burner 2 then simply being extinguished because no combustible gas is arriving.

It will be noted that, although the application of the invention to a flat portable stove seems to be of particular interest, the invention is also applicable in advantageous manner to any type of other apparatus, particularly for lighting and heating purposes, provided that they operate with a refill cartridge containing a gas under pressure.

It must moreover be understood that the foregoing description has only been given by way of example and that it does not in any way limit the scope of the invention, from which one would not depart by replacing specific details of the embodiment as described by any other equivalents.

I claim:

1. Portable apparatus including a casing having a blind ended recess shaped to receive a cartridge, said cartridge having a cylindrical wall closed at each of its two ends by a cover secured to the wall by an annular radially saliant rim and containing pressurized gas, and the cartridge having in one of said covers a central gas outlet closed by a check valve member openable by displacement of the valve member in the cartridge, the apparatus further having in the blind end of said recess a gas take-off head including an annular packing and a central finger coaxially surrounded by this packing, the head being located to register with the cartridge when the latter is tightly applied so as to press said gas outlet against said packing and insert said central finger through said outlet to displace said check valve member incident to the gas-tight connection of the cartridge with the apparatus, the invention comprising the following further improvements:

a radially movable latch and spring means urging the latch inwardly, the latch being located so as to be radially pushed away by said rim when the cartridge is axially inserted into said recess, but being returned by the spring means to lock the cartridge automatically and positively behind said rim when the cartridge reaches its position of gas-tight connection with the gas take-off head;

guiding and axial positioning means coacting with the cartridge when introduced in said recess to guide it automatically into locking relation with said latch and to retain it against retreat in a direction diametrically opposed to the location of said latch means; and manual release means operatively coupled with said latch and spring means and actuatable to unlatch the cartridge from its gas-tight connection in the apparatus.

2. Apparatus according to claim 1, said latch and spring means comprising an arm having at one end a pawl urged by said spring to contact and retain said rim and having at the other end a manual release push button accessible through a hole in said casing, and said arm being pivotally supported by the casing intermediate its ends.

3. Apparatus according to claim 1, comprising further in said blind ended recess ejector spring means operative to eject the cartridge from the recess when said latch is released from its latching position.

4. Apparatus according to claim 3, in which said ejector spring means comprises a spring blade extending into said blind ended recess and compressed against the peripheral rim of the cartridge when the latter is latched in gas-tight relationship in the apparatus.

5. Apparatus according to claim 1, in which said guiding and axial positioning means coacting with the cartridge when introduced in the recess to guide it automatically into locking relation with said latch and to retain it against retreat in a direction diametrically opposed to the location of the latch comprises, in the bottom of the blind ended recess a guiding sleeve shaped to receive the cartridge, this guiding sleeve being flared toward an open end of the recess through which the cartridge is inserted into the apparatus.

6. Apparatus according to claim 1, in which the casing has an outer opening for the blind ended recess the opening being shaped to receive the cylindricial cartridge, the diameter of the cartridge and that of the opening in the casing closely corresponding so that, when the cartridge is in its gas- tight connected position in the apparatus, its outer cover is substantially flush with the surrounding surface of the casing and virtually closes said opening.

7. Apparatus according to claim 1, in which the latch is positioned to lock the cartridge by engaging the rim of the same one of its end covers which includes the gas outlet and check valve member.

* * * * *